Figure 1:
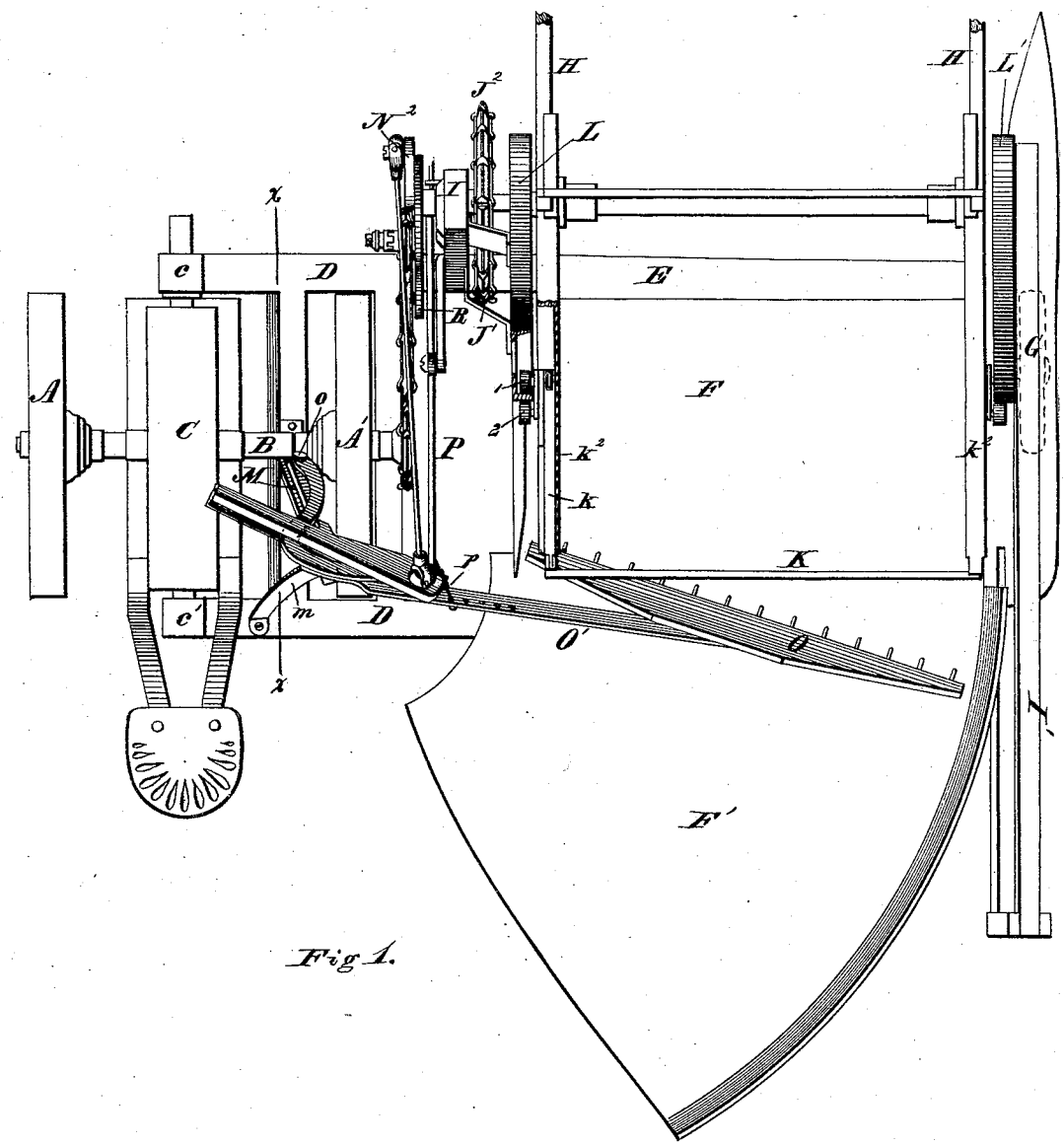

3 Sheets--Sheet 1.

E. BEACH.
Harvester-Rakes.

No. 155,358. Patented Sept. 29, 1874.

WITNESSES
Harry King
H. H. Young

INVENTOR
Elias Beach
By his Attorney
Wm D. Baldwin

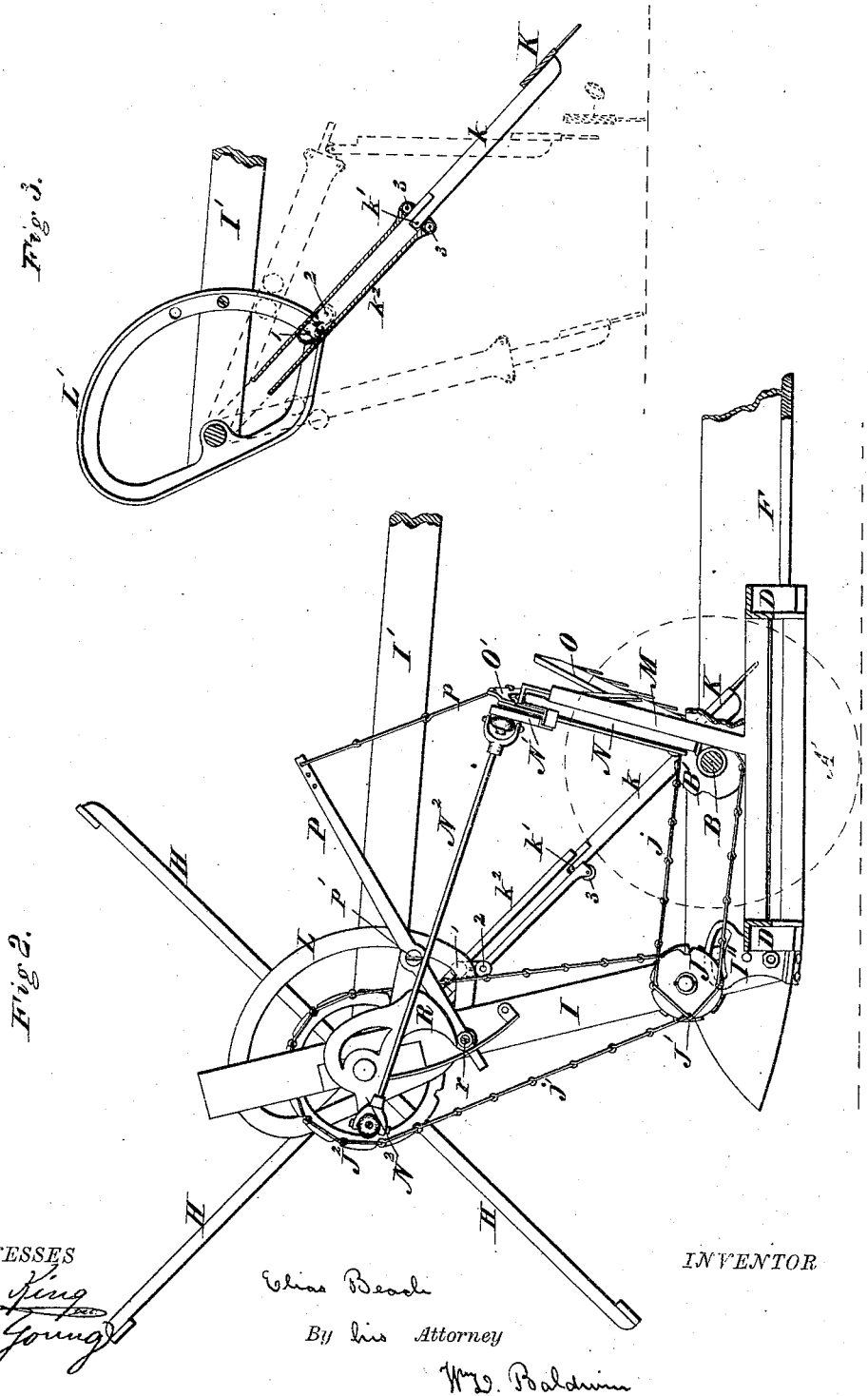

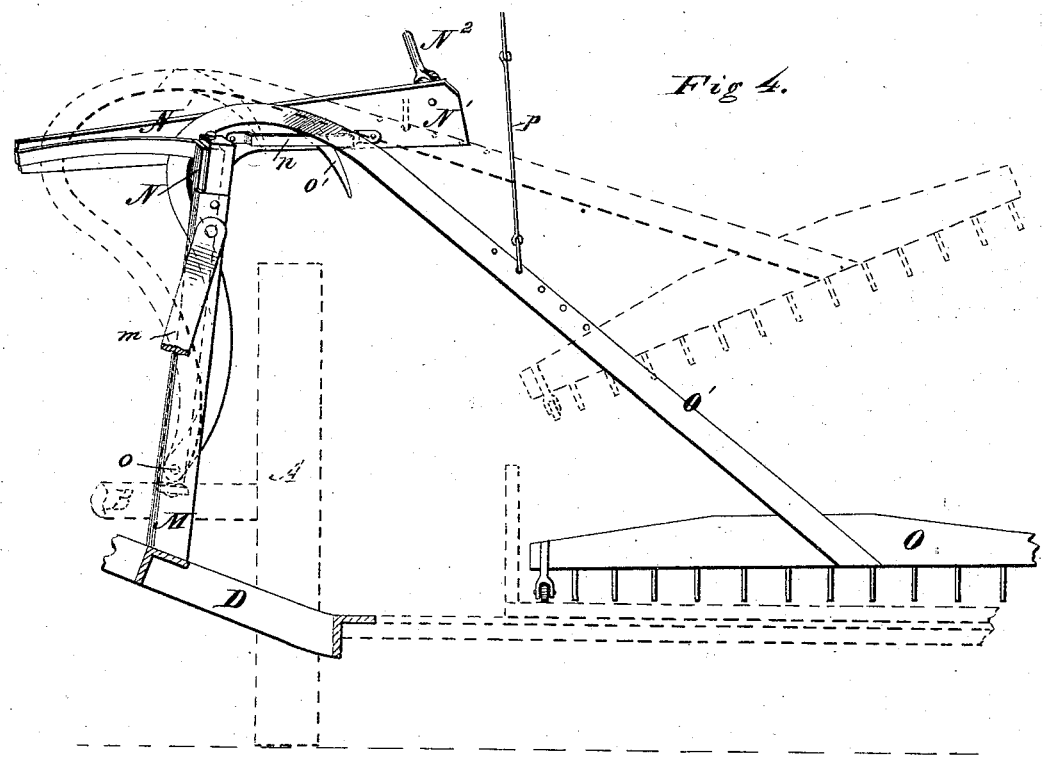

UNITED STATES PATENT OFFICE.

ELIAS BEACH, OF CHICAGO, ILLINOIS.

IMPROVEMENT IN HARVESTER-RAKES.

Specification forming part of Letters Patent No. 155,358, dated September 29, 1874; application filed September 10, 1874.

*To all whom it may concern:*

Be it known that I, ELIAS BEACH, of Chicago, in the county of Cook and State of Illinois, have invented certain new and useful Improvements in Harvester-Rakes, of which the following is a specification:

The first part of my invention relates to that class of harvester-rakes known as reel-rakes, in which one of the reel-ribs is used as a rake-head. Its objects are to gather the standing stalks to the cutters, to sweep them back upon the platform, and to allow the rake-head to rise perpendicularly after leaving the gavel; to which ends my improvement consists in mounting the rake-head on jointed arms operated by a cam or equivalent mechanism, and movable endwise in or upon its supporting arm or arms, whereby the rake-arms are alternately and automatically rendered flexible or rigid to conform to the requirements of their operation.

The next part of my invention relates to the secondary or auxiliary rake adapted to be used in combination with a reel or with my improved reel-rake. This auxiliary rake is of the well-known vibrating sweep-rake class. My object is to impart an irregular intermittent motion to it, which end I attain by vibrating the rake horizontally by a crank and vertically by a cam and connecting-link motion, or their equivalent mechanism, substantially as hereinafter set forth.

The object of the next part of my invention is to gather the standing stalks to the cutters, to sweep them when severed back upon the platform, and to deliver them to a rake, which discharges them behind the machine, out of the way of the team in the next succeeding tour around the field; to which ends my improvement consists in combining a reel-rake with a vibrating sweep-rake operated by it, as hereinafter specified.

The accompanying drawings show all my improvements as embodied in one machine in the best way now known to me. Some of said improvements obviously may be used without the others, and in machines differing in construction from the one herein shown.

Figure 1 represents a plan or top view of so much of a harvester embracing my improvements as is necessary to illustrate the invention herein claimed, with a portion of one of the guide-cams of the reel-rake broken away to show the details of its construction. Fig. 2 represents a vertical longitudinal section through the machine on the line $x\ x$ of Fig. 1. Fig. 3 is a diagram illustrating the operation of the reel-rake; Fig. 4, a similar view, showing the details of the vibrating sweep-rake.

Two main wheels, A A', are mounted in the usual way on a main axle, B, which supports a main frame, C. A coupling-frame, D, is pivoted to and rocks on trunnions $c\ c'$ in front and rear of the main frame. A finger-beam, E, and platform F are connected with this coupling-frame and supported by the usual grain-wheel G.

The machine thus far described resembles the well-known "Climax" mower in its general construction; but the joint between the coupling-frame and finger-beam is rigid instead of being flexible, as it is in that machine.

This being a "front-cut" machine, a supplementary curved platform, F', is applied behind or forms an extension of the ordinary one, so as to allow the grain to be delivered at the side of and behind the main frame. A reel, H, is mounted in suitable bearings in a post, I, (by preference mounted on the inner shoe or finger-beam,) and in an outside bearer, I'. A sprocket-wheel, B', on the main axle, drives, by means of a suitable chain, $j$, a corresponding sprocket-wheel, J, mounted on a shaft turning in bearings on the post I. A third sprocket-wheel, $J^1$, on the same shaft as the second one, but on the opposite side of the reel-post I, drives a sprocket-wheel, $J^2$, on the reel-shaft, by means of another chain-band, $j'$. By this mode of connection the reel and reel-rake are driven steadily, notwithstanding the oscillations of the machine in passing over uneven ground.

The reel-beaters proper revolve in a uniform path; but I propose to use one or more of them as a rake as well as a reel. To do this I mount a rake-head, K, on arms $k$, provided with joints or hinges $k^1$ near their middle, which hinges, while allowing the arms to flex freely in one direction, prevent them from yielding in the other to prevent the rake from falling out of line with the arms when moving downward and forward to enter the grain, as hereinafter explained. The arms $k$ slide freely endwise in radial tubular sockets $k^2$, mounted on the reel-shaft correspondently with the reel-arms. The socket-arms $k^2$ are slotted longitudinally. Studs carrying friction-rollers 1 2 project from the endwise-moving arms $k$. These rollers are mounted on opposite sides of a rocking bar pivoted on the arms $k$, so that they may always ride freely upon opposite sides of the flanges of guide-cams L L', fixed upon the reel-supports at each end of the reel, the outline of these cams being such as to give the desired contour to the path described by the rake. Friction-rollers 3 3 are shown on the' end of the tubular sockets to ease the movement of the rake-arm.

The operation of the reel-rake is shown in Figs. 1, 2, and 3. The reel-shaft is by preference hung in advance of the finger-beam, so as to gather the grain well to the cutters. Fig. 3 shows various positions of the rake, the first one (in dotted lines) being that which it occupies while sweeping back the gavel. The full lines in this figure show the position of the rake as it rises from the platform after completing its backward sweep, immediately after which the rake-arm flexes, as shown in the other dotted lines of Fig. 3, to prevent flirting the gavel, and to allow the vibrating rake, when one is used, to descend upon the gavel. As the rake rises and moves forward the rake-head falls forward, so as to bring its arms into line with their sockets, and the arms are retracted by the cam, and rendered rigid by entering the sockets as the rake enters the standing grain. The rake is gradually thrust out beyond the circle of the reel-beaters as it moves backward into the first position shown in Fig. 3.

The movements above described are repeated at each revolution of the rake.

I will now proceed to describe the construction and operation of the vibrating sweep-rake.

A post, M, is mounted on the coupling-frame between the driving-wheels, and strongly secured against backward strains by a brace, $m$. A bar, N, pivoted on this post so as to rock or oscillate axially, carries a cross-head, $N^1$, fixed thereon, and vibrated by means of a crank and pitman, $N^2$, from the reel-shaft, said pitman having a swivel-joint at each end to allow free movement to the cross-head. The rake-head O is mounted on an inclined arm, $O^1$, bent downward in a curved shape at its opposite end, and pivoted on the rocking bar N at $o$, so as to be free to vibrate in a vertical plane parallel with the face of the cross-head $N^1$ while turning freely with the rocking bar in a horizontal path. A stud, $o'$, on the rake-arm, which plays in a guide slot or groove, $n$, in the cross-head, braces the rake-arm laterally. The horizontal turning movements of the vibrating sweep-rake are derived from the crank and pitman. Its vertical oscillations are produced by means of a chain or link rod, $p$, connected with a lever, P, rocking vertically on a fulcrum, $p'$, on the reel-post, and nearly central with the lever, the opposite end of which traverses in a suitable guideway, and carries a friction-roller, $r$, acted upon by a revolving cam, R, (of the peculiar shape shown in Fig. 2,) mounted on the reel-shaft. This cam, the crank, and pitman, and the traversing rake, are so adjusted relatively to the reel-rake that, as the reel-rake completes its backward stroke, (see Fig. 2,) the vibrating rake is held suspended at the highest point of its forward movement, the crank which vibrates it horizontally being at this moment in the act of passing the dead-center, and, consequently, nearly stationary. The toe of the revolving cam at this moment also holds the rake nearly stationary at its highest point. The paths of the two rakes, it will be observed, intersect slightly at the rear extremity of one's movement, and at the front extremity of the other.

The flexing of the reel-rake as it rises clears the track for the sweep-rake, which is simultaneously released, and instantly descends upon the gavel left by the other rake, (see Fig. 3,) and sweeps it rapidly back in the arc of a circle to discharge it from the rear edge of the platform, the crank having its rapid movement during this backward discharge of the gavel. As the rake is in the act of discharging the gavel the crank again passes its dead-center and moves the rake slowly until it discharges the gavel, and then begins to move forward again rapidly. At the same time the rake is lifted by the revolving cam, and the movements above described are repeated.

The length of the stroke of the vibrating sweep-rake and its relation to other parts of the machine, may be adjusted in various well-known ways. The mechanism may also be thrown into or out of gear by the usual appliances.

My apparatus is designed for application to the fully organized harvester of the present day, which needs no description here.

I do not, broadly, claim a reel-rake, a vibrating sweep-rake, or the combination of the two, as these are all old.

I claim as of my own invention—

1. The combination of the fixed cams, the revolving reel, the tubular slotted socket-arms thereof, and the jointed rake-arms moved endwise therein by the cams, these members being constructed and operating substantially as set forth.

2. The combination of the fixed rake-post, the horizontally-rocking cross-head pivoted thereon, the vibrating sweep-rake and its pivoted arm moving in guideways on the cross-head, substantially as set forth.

3. The combination of the extensible reel-rake, the vibrating rising and falling sweep-rake, the crank and pitman which vibrates the latter, and the cam, lever, and link connections which lift it, these members being constructed and operating substantially as set forth.

In testimony whereof I have hereunto subscribed my name.

ELIAS BEACH.

Witnesses:
WM. J. PEYTON,
JOS. I. PEYTON.